United States Patent
Macovski

[11] 3,856,986
[45] Dec. 24, 1974

[54] SCANNED HOLOGRAPHY SYSTEMS USING TEMPORAL MODULATION

[75] Inventor: Albert Macovski, Palo Alto, Calif.

[73] Assignee: American Express Investment Management Company, San Francisco, Calif.

[22] Filed: Dec. 6, 1968

[21] Appl. No.: 781,842

[52] U.S. Cl. .................... 178/6.5, 178/6.8, 350/3.5
[51] Int. Cl. ...................... G02b 27/22, H04n 9/54
[58] Field of Search ............... 178/6.5, 6.8; 350/3.5; 340/5 H; 356/71; 580/153

[56] References Cited
UNITED STATES PATENTS

| | | | |
|---|---|---|---|
| 3,511,552 | 5/1970 | Osterberg | 350/3.5 |
| 3,550,084 | 12/1970 | Bigelow | 356/71 |
| 3,573,362 | 4/1971 | Burchardt | 350/3.5 |
| 3,597,525 | 8/1971 | Kozma | 350/3.5 |

OTHER PUBLICATIONS

Optical Society of America–Fiftieth Anniversary Meeting Program, Mar. 15–18, 1966 – pp. 7, 8.
Bryngdahl – Polarizing Holography – Josa – Vol. 57, April 1967 – pp. 545, 546.
Deschamps – Some Remarks of Radio Frequency Holography, Proc. of IEEE – April 1967 – Vol. 55, pp. 570–571.
Collins – Difference Holography – Applied Optics, January 1968 – Vol. 7, No. 1, pp. 203–204.

*Primary Examiner*—Howard W. Britton
*Attorney, Agent, or Firm*—Urban H. Faubion

[57] ABSTRACT

A hologram from which a three-dimensional image of a three-dimensional object may be reconstructed is provided by combining the light scattered by the object with light from a reference light beam and cyclically offsetting in time (displacing in phase) the relationship between the reference and object beams thereby to form an image information beam which generates an interference pattern containing light information which includes conjugate images of the subject as well as undesired light information. The image information beam is temporally scanned in a plane essentially perpendicular to its axis (as by an image dissector) to generate a complex electrical wave form having frequencies containing information relative to the conjugate images of the object as well as the undesired light information. Only the frequencies having the conjugate image light information are passed to produce a holographic image as on at least one display tube (e.g.; cathode ray tube). A hologram recording from which an image or images of an object can be reconstructed, may be formed as by taking a photographic transparency of the holographic image on the display tube.

26 Claims, 14 Drawing Figures

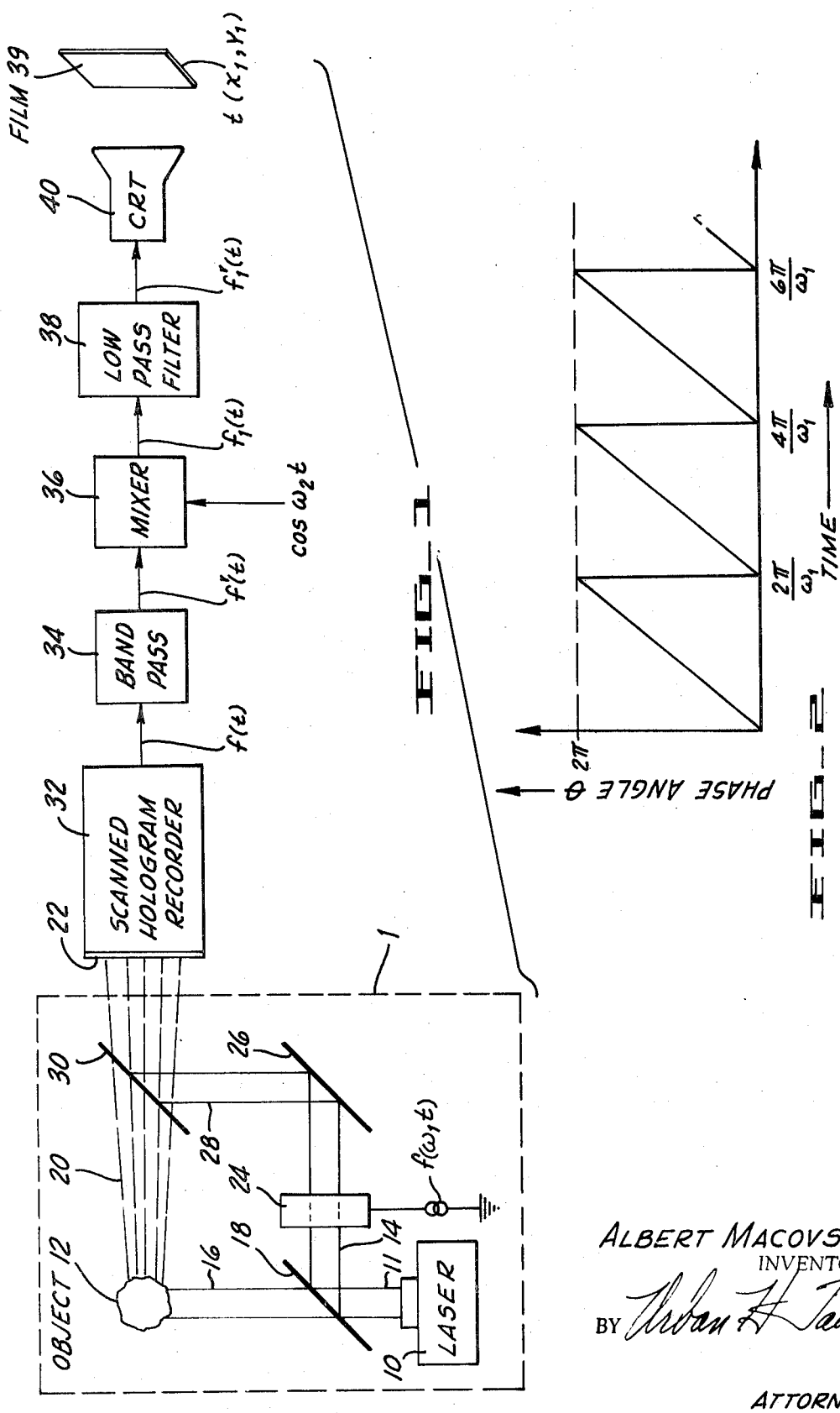

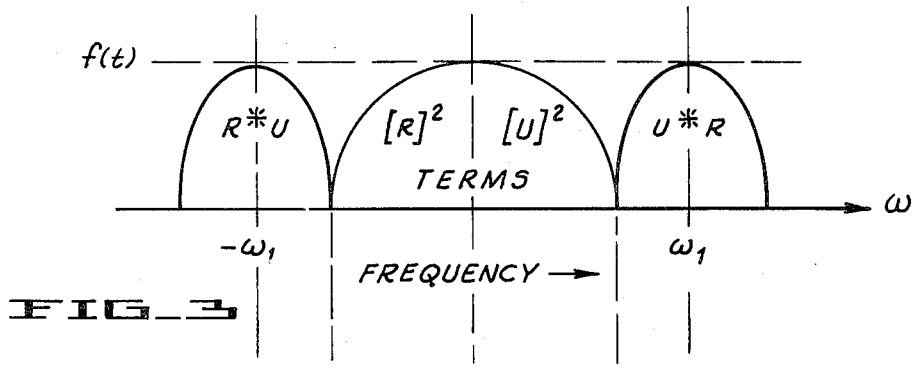
FIG_3
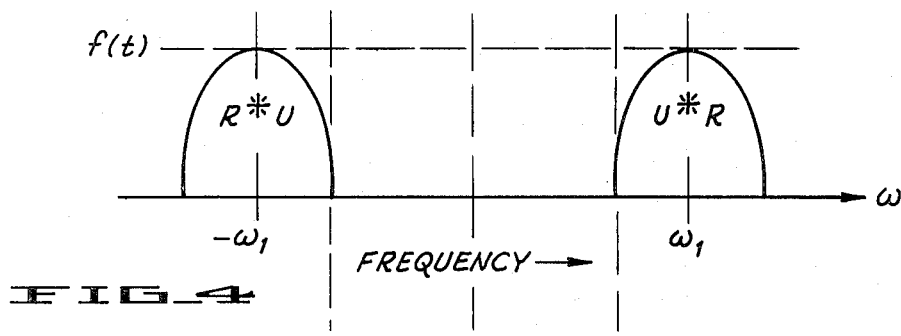
FIG_4
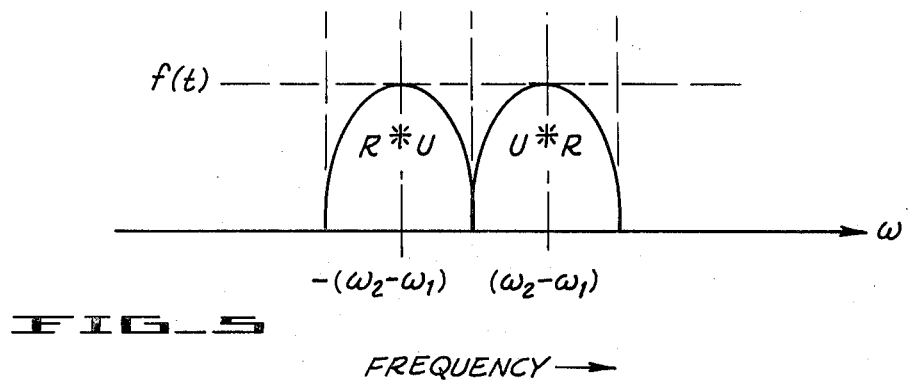
FIG_5

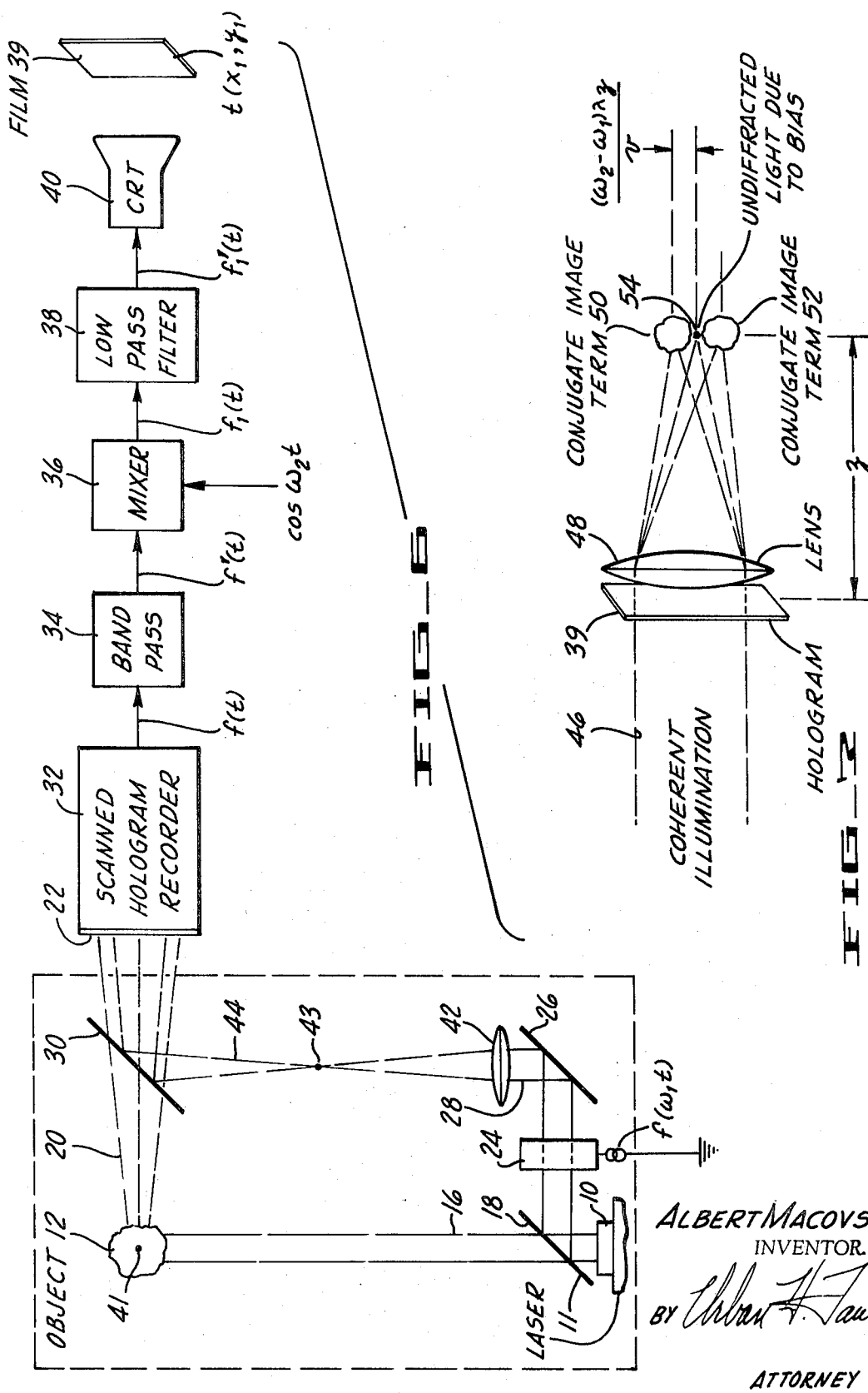

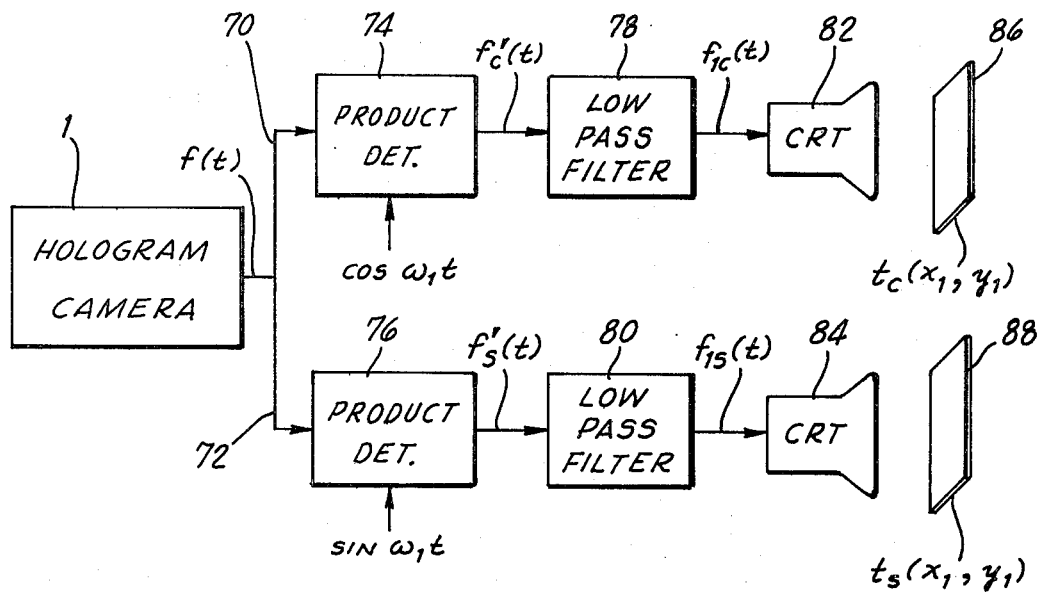
FIG_9
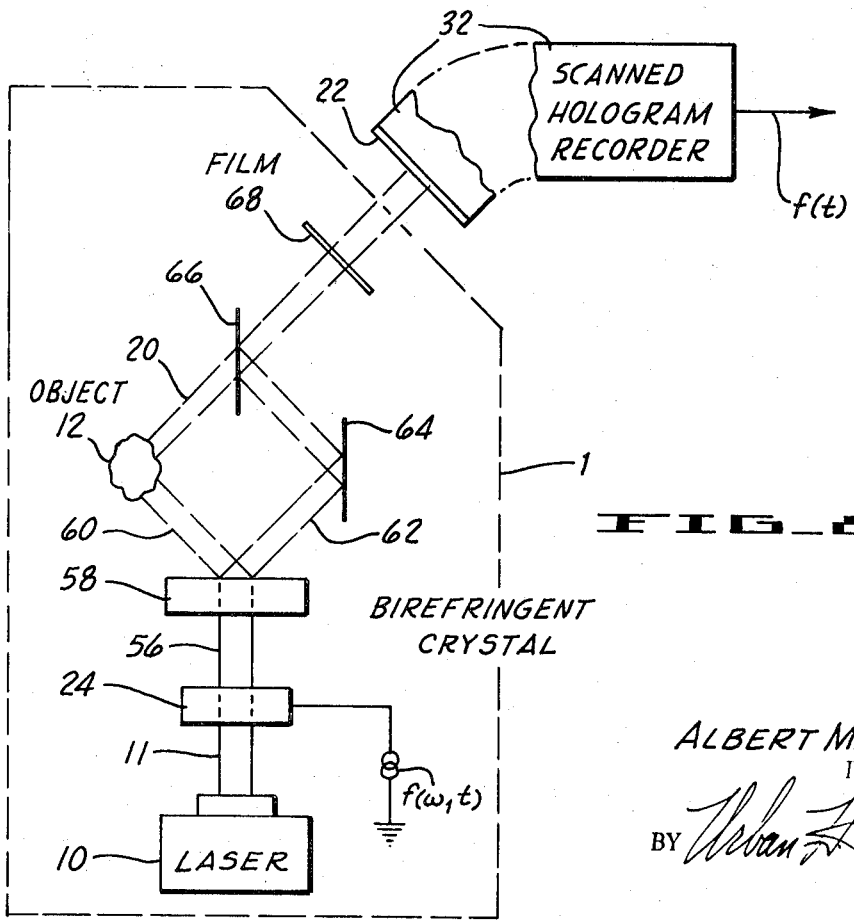
FIG_8

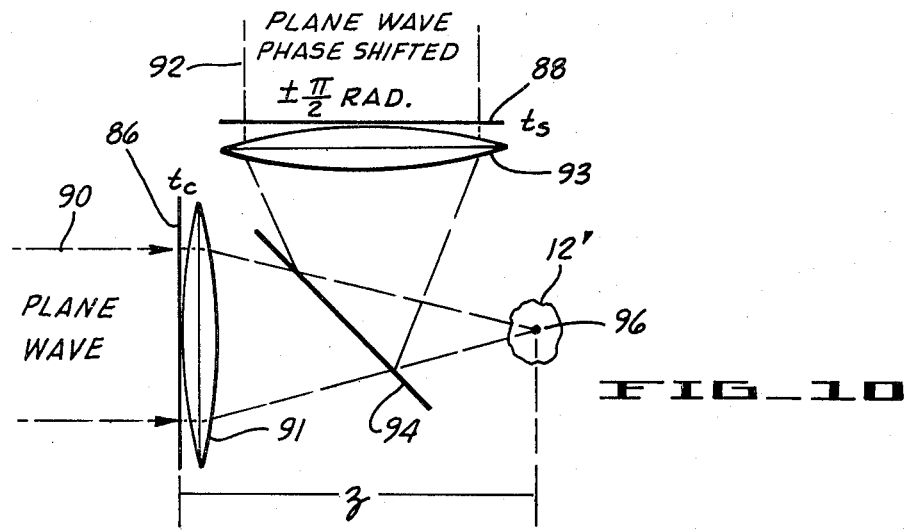
FIG_10
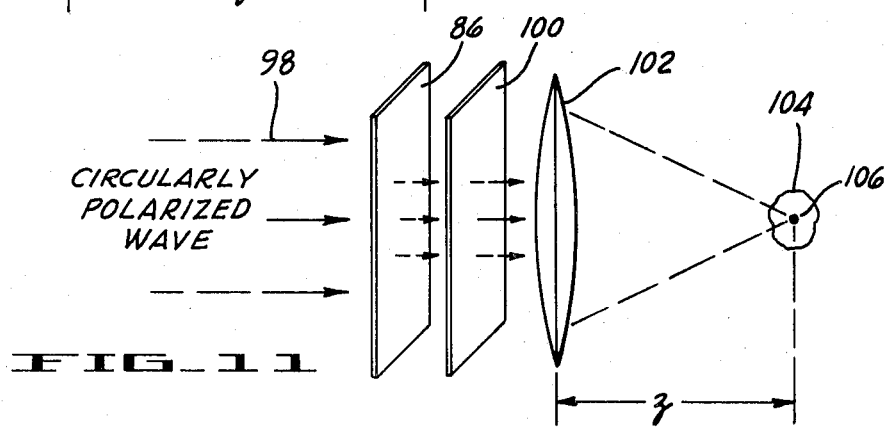
FIG_11
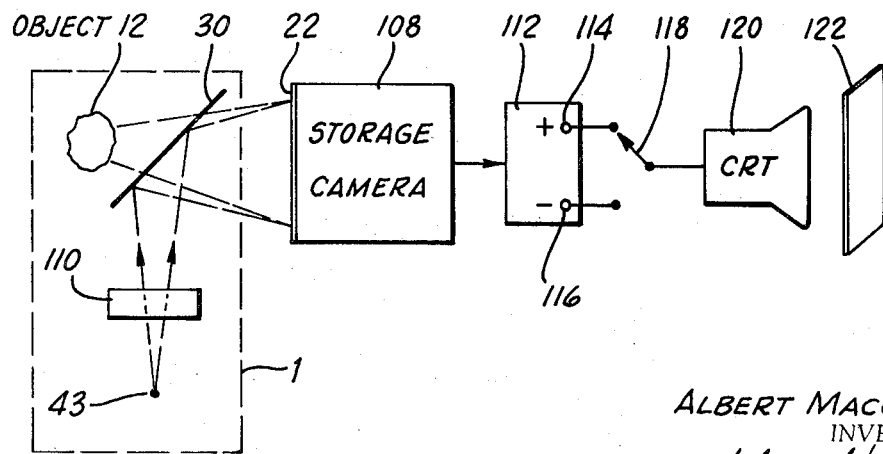
FIG_12
ALBERT MACOVSKI
INVENTOR.
BY
ATTORNEY

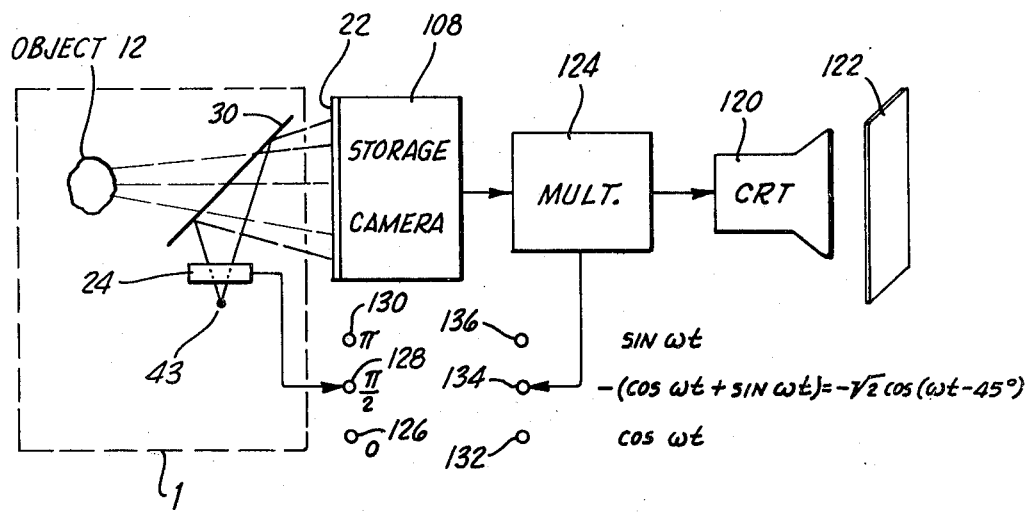
FIG_13
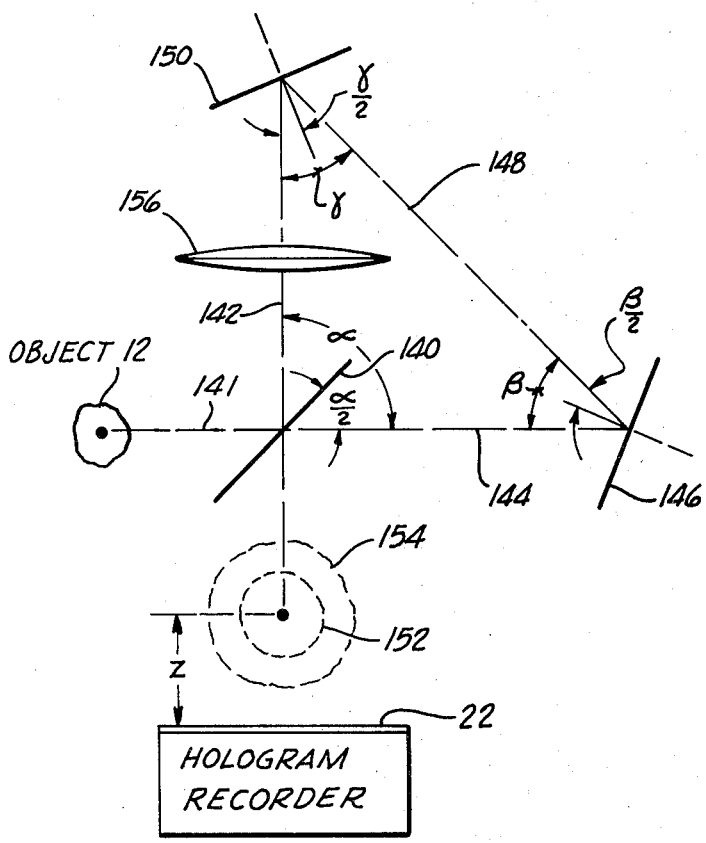
FIG_14
ALBERT MACOVSKI
INVENTOR.
BY *Urban H. Faubion*
ATTORNEY

SCANNED HOLOGRAPHY SYSTEMS USING TEMPORAL MODULATION

This invention relates to an improved holographic system wherein the required spatial frequencies in the hologram recording plane are minimized thus avoiding the necessity for using very high resolution recording devices (as high resolution film), and at the same time providing that the spatial frequencies of the various light information components are separable.

A holographic system is one wherein light diffracted by an object or reflected from an object is presented with a reference wave to produce a complex light interference pattern that contains information about both the amplitude and phase of the light diffracted or reflected from the object. The interference pattern can be recorded even on photographic film which responds only to intensity and the recorded interference pattern is called a hologram. By directing light having a frequency content substantially corresponding to that of the light diffracted or reflected by the original object through the recorded interference pattern, an image of the original object can be obtained. Where the original object is a three-dimensional subject, the image of the original object so obtained is a three-dimensional reconstruction.

Recognition that information about the amplitude and phase of diffracted light rays can be recorded on photographic film and that the image of an object thus diffracting the light rays can be reconstructed using the exposed film is attributed to Dennis Gabor. Gabor called the photographic film recording a "hologram" meaning a "total recording," and the imaging process "wave-front reconstruction." Gabors contribution is highly significant and has changed the theory of image formation as well as much of the direction of modern optics.

The specific means of image reconstruction utilized by Gabor (called on-axis holography) has the advantage that the photographic film used to record the information about the amplitude and phase of the diffracted waves may be a low-resolution film. However the system has the disadvantage that it is difficult to separate the desired image from interfering light and other images in the reconstructed wave.

In order better to understand the advantages of the invention, some discussion of the theory of holography is desirable. Gabor's idea was to add a reference wave of amplitude R to the light wave scattered by an object and having an amplitude U and record the resultant interference pattern on film. Assume both the illuminating object light wave with the reference wave having uniform phase fronts (spatially coherent). The intensity of the resultant interference pattern in the plane of the recording medium is equal to the sum of the amplitudes of the individual incident waves squared, and thus may be represented by the following equation:

$$I = [R + U]^2 = R^2 + U^2 + R^*U + U^*R$$

The $R^2$ and $U^2$ terms represent undesired information in the sense that they only give information relative to the intensities of the reference and object waves respectively. The $R^*U$ and $U^*R$ terms are complex conjugates and represent desired interference terms from which reconstructions of the virtual and real images respectively (the two images are considered conjugate images) can be made. The difficulty with the Gabor on-axis hologram is that the desired conjugate images along with undersired intensity information relative to the object and reference waves are all superimposed in space in the final reconstruction. For a more complete description and illustration of the limitations of Gabor on-axis holograms, see *Introduction to Fourier Optics*, by Joseph W. Goodman, McGraw-Hill, 1968, pp. 207 and 208.

In an effort to separate meaningful images from the background "noise" in a holographic system, an off-axis system was proposed by E. N. Leith and J. Upatnieks. In this system the recording plane receives light from the object and the reference wave from different locations. The frequency of the interference fringes which must be recorded on the hologram is increased as a function of the angle between the axes of the interfering waves. Thus, it is necessary to utilize a recording medium (e.g., film) which has a much higher resolution than is necessary to make the same recording using the on-axis holographic system.

In a typical off-axis arrangement a plane reference wave of amplitude R is brought in at an angle $\theta$ relative to the recording plane and a scattered object light wave of amplitude U impinges on the recording plane from an on-axis position. The resultant intensity is given by $$I = [Re^{-jk\beta y} + U]^2 = R^2 + U^2 + R^*Ue^{jk\beta y} + + U^*Re^{-jk\beta y}$$

where $\beta = \sin \theta$. When a hologram made with this system is illuminated with coherent light on an axis perpendicular to the hologram plane, the background "noise" ($R^2$ and $U^2$) which contain only information relative to the intensity of the object and reference waves in effect pass straight through the hologram plane and are only slightly diffracted, while the real and virtual images ($U^*R$ and $R^*U$ terms, respectively) are diffracted in opposite directions at angles $\theta$ and $-\theta$. That is, the real and virtual images appear on opposite sides of the hologram plane each displaced at an angle $\theta$ on the same side of the axis of the reconstructing light beam.

The price paid for the important spatial separation of the desired light information is the increased spatial frequency response requirements of the recording medium. That is, the desired image representations all occur at high spatial frequencies about the carrier $k\beta$; thus, the use of special high resolution films which are very insensitive and require long exposures is required. Since a vibration of any kind during exposure completely destroys the interference pattern and off-axis systems require such long exposures, all equipment used in such systems must be mounted on an isolated foundation which is vibration free.

It is an object of this invention to combine the advantages of both the Gabor on-axis system and the Leith and Upatnieks off-axis system to provide a system of recording holograms wherein the images are readily separated and no increase in spatial frequency response (increase over that required for the Gabor on-axis system) is required in order to record the light information.

The temporal offset provided by the present invention also makes holography with incoherent light practical.

Another disadvantage of prior art holographic systems is that the long exposures, equipment, and arrangement of equipment virtually eliminates the possibility of a real time reconstruction of objects. Therefore, it is another object of the present invention to provide a system which makes holography available for real-time reproduction in systems such as television.

In carrying out the present invention an interference pattern is set up between light scattered from an object, the image of which is to be reconstructed, and a reference light source and the desired image terms are offset on a temporal frequency carrier by cyclically temporally offsetting the relationship between the reference and object beams so that filtering may be accomplished in an electrical system. That is, the interference pattern is temporally scanned in order to generate electrical wave forms containing the light information and the frequencies of the various light-information terms are so separated that the undesired light information may be filtered out and the desired image information is passed, recorded and or reconstructed.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawings in which:

FIG. 1 is a schematic illustration showing a scanned holography system which uses temporal modulation according to the present invention, and which uses a plane reference wave;

FIG. 2 illustrates a sawtooth wave form which represents the manner in which the plane reference wave is modulated to provide a temporal modulation; that is, time is plotted on the axis of abscissae, and the phase angle is plotted along the axis of ordinates and the illustration shows that the phase is modulated $2\pi$ radians, then returned to its initial reference position cyclically;

FIGS. 3, 4 and 5 are electrical frequency domain plots with frequency plotted along the axis of abscissae and intensity plotted along the axis of ordinates and showing the frequency bands wherein the light information components, separated at the various stages of the holographic system of FIG. 1, appear;

FIG. 6 is a diagrammatic illustration of a holographic system similar to that of FIG. 1 wherein a point reference source is utilized;

FIG. 7 is a schematic illustration showing the system for a reconstruction of the images produced by a holographic system such as that of FIG. 6, as well as the location of images so reconstructed;

FIG. 8 is a diagrammatic illustration showing a holographic system according to the present invention where modulation of both the reference and object waves is utilized;

FIG. 9 illustrates diagrammatically another holographic system using temporal modulation according to the invention and providing two transparencies which must be superimposed in order to reconstruct an image;

FIG. 10 is a schematic diagram showing a method of reconstructing an image from the transparencies generated by the system of FIG. 9;

FIG. 11 illustrates a means of reconstructing an image made from a pair of 90° polarized encodings on vectograph film as discussed relative to the system of FIG. 9;

FIGS. 12 and 13 illustrate diagrammatically holographic systems which utilize storage-type camera to translate the intensity pattern at the hologram plane into electric wave forms; and FIG. 14 illustrates a holographic system capable of using the temporal modulation of the present invention to produce holograms using incoherent light sources.

In considering the figures, it is well to keep in mind that separation of the desired images is obtained by temporal relative modulation of object and reference waves so that spatial offset of the reference and object waves is not required. This is not to say that the invention cannot be used effectively in off-set or off-axis systems. The offset required for separation of the desired image information can be substantially reduced and further generation of electrical signals containing frequency bands representing the desired image information allows the frequency bands to be "beat down" in frequency by heterodyning. Thus, the invention improves most any on-axis or off-axis system.

A preferred on-axis embodiment of the invention is illustrated in FIG. 1. A single source of coherent light, a laser 10, generates both object and reference beams. The coherent beam 11 of laser 10 is directed toward the object 12, the image of which is to be reconstructed. A reference beam 14 and an incident object beam 16 are formed by placing a half-silvered mirror 18, known as a beam splitter, in the path of the coherent laser beam 11 at a 45° angle relative to the beam axis and between the laser 10 and object 12. The term "beam-splitter" is used because the mirror 18 is constructed so that substantially half of the incident light is transmitted (here forming the object beam 16) and half is reflected (constituting reference beam 14).

As something of a degression at this point, it is noted that the illustrations and description deal with three-dimensional objects and image reconstruction of three-dimensional objects. However, it is obvious that with minor and totally conventional state-of-the-art modifications, transparent and opaque two-dimensional objects may be substituted for the three-dimensional ones illustrated. Reconstruction of such two-dimensional objects are made in precisely the same way described and illustrated relative to the three-dimensional reconstructions.

Since the beam splitter 18 is at a 45° angle relative to the incident beam 11, the reference and incident object beams 14 and 16 respectively are disposed at 90°. The light from the incident object beam 16 is scattered and reflected from the object 12 to form the scattered object beam 20 (hereinafter called object beam). The object beam 20 is incident upon a plane 22, which we may call the plane of interference pattern 22. The plane of interference pattern 22 is considered here perpendicular to the axis of the object beam 20.

In order to provide a cyclical temporal offset between the reference and object waves 14 and 16, a light frequency shifter 24 is inserted in the path of the reference beam 14. In this case the frequency shifter 24 constitutes a single side-band modulator which shifts the frequency of reference wave 14 by an amount $\omega_1$. The light from reference wave 14 thus modulated is recombined with light from the reflected object wave 20 by an arrangement of mirrors. That is, a mirror 26 is positioned in the path of the modulated reference beam 28 at an angle of 45° relative to its axis (parallel to the plane of beam splitter 18) thus reflecting the modulated beam 28 at an angle of 90° (upward in the drawing) to another beam splitter 30 placed at a 45° angle to the path of the modulated reference beam 28 (parallel to both beam splitters 18 and reference beam reflecting mirror 26) in such a manner that it combines the modulated reference beam 28 and the reflected object beam 20. In this embodiment, the final mirror for combining the two beams is a beam splitter, because the modulated reference beam 28 must be brought to the plane of interference pattern 22 on-axis with the center of the reflected object beam 20 (at an angle of 0° relative to one another) in order to form the desired interference pattern. The on-axis arrangement effectively minimizes spatial frequencies at the plane of interference pattern 22.

In order better to be able to understand how the desired image information is separated from undesired light terms, consider the information obtained by summing the object and reference beams at a given plane such as the plane of interference pattern 22. The intensity of the light scattered from the object is designated by U and the amplitude of the reference wave which is offset in frequency by an amount $\omega_1$ using the modulator 24 is $Re^{j\omega_1 t}$ where R represents the amplitude of the unmodulated reference wave. Thus, the sum of the two beams at the plane of interference pattern 22 is represented by $$I = [Re^{j\omega_1 t} + U]^2 = [R]^2 + [U]^2 + R^*Ue^{-j\omega_1 t} + U^*Re^{j\omega_1 t}$$

The above equation shows that in the interference pattern neither the reference term (the $R^2$ term) nor the term which results from the various object points interfering with each other (the $U^2$ term) is modulated, while the desired interference fringes due to the conjugate images (contained in the virtual image term $R^*U$ and the real image term $U^*R$) are modulated or offset by an amount corresponding to the offset frequency $\omega_1$. Thus, the time domain allows separation of real and virtual images from each other and from the various "noise" components.

The type of phase modulator or variable time delay device 24 used in the illustrated embodiment is one of the class of electro-optic devices which consists of an electro-optic material having an index of refraction proportional to the voltage applied to the cell. Voltage is applied to the modulator 24 in the form of a sawtooth wave which returns from its maximum of $2\pi$ radians to zero every $2\pi/\omega_1$ seconds. This results in the phase shift illustrated in FIG. 2 where time is plotted along the axis of abscissae and phase shift along the axis of ordinates. The voltage increases linearly from zero at zero time to a maximum at $2\pi/\omega_1$ seconds and the index of refraction of the electro-optic material increases as the voltage increases; thus effectively slowing down the reference light beam 18 as it passes through the electro-optic modulator 24 shifting the phase linearly to $2\pi$ radians. At time $2\pi/\omega_1$ the applied voltage is abruptly reduced to zero and the index of refraction of the electro-optic modulator 24 is reduced to a minimum, and the phase shift returns to zero. Thus, the reference light wave 14 is effectively slowed down and speeded up as it passes through the electro-optic cell 24, thus providing a phase modulation and a shifted frequency. For a more complete description of this action see U.S. Pat. No. 3,353,896, Nov. 21, 1967, issued to D.J. Blattner and entitled "Light Frequency Shifter."

From the form of the intensity equation above, it will be recognized that the intensity pattern can be recorded on a scanning device which can respond to the offset frequency $\omega_1$. One pickup or scanning device which will do the job (referred to in FIG. 1 as the scanned hologram recorder 32) is a mechanically scanned photocell or an electronically scanned image dissector. For purposes of the present description, assume that scanned hologram recorder 32 is a conventional image dissector.

The electrical wave form $f(t)$ generated by the image dissector 32 then has the light information relative to all of the interference pattern scanned. That is, the resultant signal or electrical wave form generated by the image dissector 32 is representative of the intensity equation expressed above and has the same form.

An understanding of the separation of the terms of the intensity equation may best be had by reference to FIG. 3 which illustrates the electrical frequency domain. In this Figure, frequency is plotted along the axis of abscissae and intensity is plotted along the axis of ordinates. The undesired $R^2$ and $U^2$ terms occur in a midband of frequencies about the axis of ordinates, whereas the frequencies of the $U^*R$ term and the $R^*U$ term (the conjugate images) occur in "side bands" spaced above and below the midband.

Since the interference pattern is varying cyclically in a manner determined by the frequency of modulation of the light modulator 24 in the reference beam path, the horizontal scan velocity $v$ of the image dissector 32 must be timed such that the relative phase of the wave form generated (and thus the relative phase of the intensity pattern "seen" by the scanning beam) is the same on each successive scan line. This is accomplished by making the horizontal scan frequency of the image dissector 32 an integral divisor of the frequency of modulation $\omega_1/2\pi$. Thus, the frequency of scan is locked to the offset frequency and, for a uniform object wave, each successive scan line generates the same pattern and consequently a uniform grating pattern in the direction of the horizontal scan. The center frequency of the side-bands which contain the conjugate image information (side-bands containing $U^*R$ and $R^*U$ terms) are located above and below the central axis of ordinates in the plot of FIG. 3 by an amount $\omega_1$ which corresponds to a spatial frequency of $\omega_1/v$; in other words, by an amount determined by the offset frequency. Thus, in order to separate the conjugate image terms and reject the undesired terms, the scanned hologram recorder 32 is followed by a bandpass filter 34 tuned about the frequency $\omega_1$. The resultant electrical wave form $f(t)$ is still a function of intensity and is of the form $$f'(t) = R^*Ue^{-j\omega_1 t} + U^*Re^{j\omega_1 t}$$

The plot of FIG. 4 which has the same ordinates and abscissae as does that of FIG. 3 illustrates how the output of the bandpass filter 34 includes the sidebands containing the desired conjugate image terms but eliminates entirely the undesired midband of frequencies. It is not essential that bandpass filter 34 be utilized here but it assures less interference in the system.

Since the conjugate image terms are separated and the undesired terms are eliminated from the electrical wave form at this point, it would be feasible to reproduce the images on a display such as a cathode ray tube; however, this would be an inefficient use of the tube and require a relatively high resolution device since, as noted from the diagram of FIG. 4, the center frequency of the two conjugate image terms are at $\pm\omega_1$, corresponding to a spatial frequency of $\omega_1/v$ when reproduced. Thus, to reproduce the image information bands, it would require a high resolution display and the information would appear at widely separated locations. In order to reduce the distance between the bands of information containing the conjugate images and the associated resolution requirement, the bandpass filter 34 is followed by a mixer 36, which multiplies the information containing electrical wave form $f_1(t)$ by a function of $\cos\omega_2 t$. This serves to heterodyne the image containing sidebands down to the the difference frequency $(\omega_2 - \omega_1)$. The difference frequency can be reduced to the point where the two conjugate image spectra, $R^* U e^{-j(\omega_1 - \omega_2)x/v}$ and $U^* R e^{j(\omega_2 - \omega_1)x/v}$ meet at the origin. The output of the mixer, $f_1(t)$, is illustrated in FIG. 5 which has the same ordinates and abscissae as FIGS. 3 and 4. Here the conjugate image information bands meet at the origin, and thus are each centered at frequencies $\pm(\omega_2 - \omega_1)$, corresponding to a spatial frequency of $(\omega_2 - \omega_1/v)$ from the origin. A low-pass filter 38 may be inserted in the system after the mixer in order to eliminate the high frequency mixer products and make sure the wave form $f_1'(t)$ contains as few unessential frequencies as possible.

In order to provide a visual display (a holographic image) of the conjugate image information and a means of recording the hologram, low pass filter 38 is followed by a display tube such as a cathode ray tube 40 and a film plate 39 or other recording medium is provided to take a picture of the holographic image displayed on the face of cathode ray tube. Only the desired conjugate image information is contained in the holographic image.

Since the sidebands containing the conjugate image information have been reduced in frequency as far as possible without causing them to overlap, the spatial frequency requirements or required number of lines for the reproducing devices (cathode ray tube 40 and film plate 39 here) are twice that of the pickup camera in the horizontal x-direction (because of the two conjugate images being reproduced) and equal to that of the camera in the y-direction. Thus, the resolution requirements for these devices is minimized.

Most efficient use of hologram recording devices are made in the system because spatial frequencies in the hologram recording plane are minimized. That is, if the required spatial frequencies in the hologram plane are minimized, lower resolution devices are required or if high-resolution recording devices are used, they are used to their best advantage.

The optimum reference wave for minimizing spatial frequencies in the hologram plane is a point reference wave emanating from the center of the object space (in the center of the object whose image is to be reconstructed), since it minimizes the angle between light scattered by each point on the object and the reference light with which it interferes to form the interference pattern in the holographic plane. Previously known holographic systems have been satisfactory for reconstruction of three-dimensional objects provided that the point reference is spatially offset from the object. The use of a point reference source in a conventional on-axis system produces image overlap in the reconstruction as discussed relative to the Gabor on-axis system.

The temporal modulation or frequency offset system described here allows the use of a point reference wave emanating apparently from the center of the object whose image is to be reproduced. As theory predicts, this arrangement does in fact minimize the spatial frequencies in the hologram recording plane. For an understanding of a physical arrangement which will produce a point reference wave in the center of object space, reference may be made to FIG. 6 of the drawings. Most of the elements of FIG. 6 correspond exactly to those of FIG. 1 and therefore like elements of the two Figures are given corresponding numbers. The difference, as illustrated, between FIG. 6 and FIG. 1 lies between the half-silvered mirors 26 and 30 in the modulated reference wave 28.

In order to produce a point reference wave which apparently emanates from the center of the three-dimensional object 12 the image of which is to be reproduced, the modulated reference wave 28 reflected by mirror 26 is focused by a lens system 42 into a reference point 43, which is substantially the same distance from the center of the half-silvered mirror 30 through which the object wave 20 passes toward the plane of interference pattern 22 as is the center of the object 12. Thus, the reference wave 44 impinging on half-silvered mirror 30 appears to come from a point that is the same distance from the center of the half-silvered mirror 30 as is the center point 41 of object 12. The light from point reference source 43 reflected from the half-silvered mirror 30 to the plane of interference pattern 22 is indistinguishable as far as interference plane 22 is concerned from light which would emanate from a point source at the center 42 of object 12. Thus, the reference point 43 is effectively positioned in the center of the object as shown in FIG. 6.

Using the arrangement of FIG. 6 the hologram recording on film plate 39 is made in exactly the same way described with regard to the system of FIG. 1.

FIG. 7 illustrates a system for reconstructing the conjugate images in the most conventional fashion. The hologram film recording 39 is subjected to light 46 from a source of coherent illumination (not shown) having the same characteristics as the illumination utilized to create the hologram 39. Light passing through the hologram 39 is diffracted by the recorded pattern and focused by a lens system 48 to reconstruct the conjugate images 50 and 52. The lens system 48 is necessary since a point reference source was used in making the hologram. In the system illustrated the lens system 48 is chosen to have a focal length z which produces conjugate images 50 and 52 having a 1 to 1 relationship in size to the original object 12 from which the hologram was made. In this case, then, the distance z from the plane of hologram 39 to the images 50 and 52 produced is substantially the same as the distance from the object 12 to the plane of interference pattern 22.

The center of the reconstruction contains a point image 54 which represents undiffracted light due to bias. The reconstruction is not unlike the frequency domain pattern of FIG. 5. That is, in the frequency domain plot of FIG. 5, there are two side-bands containing conjugate image terms above and below the axis of abscissae with the center frequency of those bands resulting in a spatial frequency of $\pm (\omega_2 - \omega_1/v)$, and in the reconstruction of FIG. 7 the conjugate images 50 and 52 are reconstructed on opposite sides of the center 54 with their centers $(\omega_2 - \omega_1/v) \lambda z$ from the center 54 of the reconstruction where $\lambda$ is the wavelength of the coherent illumination, $z$ is the lens focal length, $v$ is the scan velocity of the image dissector 32, $\omega_2$ is the heterodyning frequency and $\omega_1$ the original offset frequency introduced by phase modulator 24.

The focal length of the lens system 48 does not have to be equal to the distance between the object 12 and the plane of interference pattern 22. If the focal length is made greater, the reconstructed images will be further removed from the plane of the hologram 39 and if it is made less, the reconstructed images will appear closer to the plane of the hologram 39. The images will either be magnified or reduced in size, depending on the optics. Further, it is not essential that the hologram illuminating wave 46 be the same as the original object illumination. Types of illumination which may be utilized for image reconstruction are treated elsewhere and are not considered part of the present invention.

In order to present practical values for the parameters involved, consider the coherent point reference hologram system described in connection with FIG. 6. A HeNe laser having a wavelength $\lambda$ of 632.8 nanometers provides the source of coherent light 10. The optics has already been described. The pickup device 32 used is an image dissector which has a resolution of approximately 300 lines in each dimension. It is operated at a horizontal line frequency of 1⅞ cps or 1,825 second per scan. The vertical scan time to produce 300 lines at this horizontal scan rate is 216 seconds. The required baseband video bandwidth to preserve 300-line resolution at the listed horizontal scan time is 208 cps.

As previously explained, the offset frequency $\omega_1$ (provided by modulator 24) and mixer frequency $\omega_2$ (provided by mixer 36) must each be integral multiples of the line frequency $\omega_2$ so that the temporal offset will result in a spatial offset in the $x$ (horizontal) direction. To provide the offset frequency $\omega_1$ a 1,000 cps offset frequency triggers a sawtooth generator (not shown) which drives a light modulator consisting of a KD*P (potassium di-deuterium phosphate) crystal. The axial electric field controls the difference in index between the crystal vertical and horizontal polarizations. In this application, however, the linearly polarized light is lined up with either the vertical or horizontal axis so that the device acts as a phase modulator with one of the indices being linearly changed by the applied voltage. These devices are relatively insensitive so that a sawtooth of 7,200 volts peak to peak is required to provide the necessary $2\pi$ radians of phase shift.

The desired image information appears within 208 cycles on either side of the 1,000-cycle offset frequency sin e the baseband video bandwidth is 208 cycles. This 792–1,208 cps offset signal is applied to a band pass filter 34 consisting of a double-tuned circuit. It is then mixed with the 1,225 cps mixer reference 36 and applied to the low pass filter 38 to reduce the offset frequency of 225 cycles. Thus the output signal has a bandwidth of 17–433 cps. To completely reproduce this signal at the line frequency of 25/18 cps requires a horizontal resolution of 623 elements. A cathode ray tube 40 capable of providing the required output resolution is used.

The system is symmetrical in the sense that, as long as the reference and object waves are modulated one with respect to the other, it is not significant which of the waves is temporally offset. In fact, if the offset is properly phased, it is advantageous in some instances to modulate both the reference an object waves. Since modulation of the object wave relative to the reference wave may be accomplished simply by moving the modulator 24 (referring to FIG. 1) into the path of the object wave, e.g., such as in the path of object wave 16 between the beam splitter 18 which forms the reference wave from the incident light of laser 10 and the object 12, it is believed that a separate illustration to show this arrangement is unnecessary. However, a practical way properly to modulate both the reference and object beams relative to one another is more complex. Such a system is illustrated in FIG. 8.

Only the camera part of the system (the box 1 in FIGS. 1 and 6) is illustrated since this is the only portion that is modified and, further, since the components utilized in this system are generally the same as that illustrated and described with respect to FIG. 1, the corresponding components in both systems are given corresponding reference numerals. For example, again the coherent light source 10 is a laser which generates a vertically polarized beam. For this embodiment of the invention where modulation of both reference and object waves take place, it is desired to have reference and object waves with different polarzations. The birefringent crystal KD*P modulator 24 has the characteristic that as the voltage across the crystal is increased, the index of refraction increases for vertically polarized waves (a vertically polarized wave is slowed down) and its index of refraction decreases for a horizontally polarized wave (the wave speeds up as it passes through the crystal). Thus, instead of aligning the birefringent crystal modulator 24 so that its vertical polarization is aligned with the vertically polarized laser beam as is done for best efficiency in the embodiment of FIG. 1, the crystal is rotated so that it is oriented with its vertical polarization at a 45° angle relative to the vertical polarization of the laser beam.

Under these conditions of alignment, as the voltage across the crystal is cyclically increased and dropped back to the zero, describing a saw-tooth waveform as described in connection with FIG. 2, the components of the light wave 56 which emanate from the modulator 24 that are vertically and horizontally polarized are modulated in opposite senses. That is, the one component of the wave is speeded up while the other is slowed down, thus effectively giving twice as much phase modulation for a given voltage (or allowing the same modulation with half the applied voltage) as is obtained when utilizing only one component of the birefringent modulator 24 as is utilized in the embodiment of FIG. 1.

Having the vertical and horizontal components modulated in opposite senses relative to each other it is necessary to divide the two components in order to provide an object beam and a reference beam which are modulated relative to each other. This is accomplished by inserting a birefringent material such as a calcite crystal 58 in the output beam 56 from the modulator 24. The birefringent crystal 58 has different indices of refraction for vertically and horizontally polarized light waves and therefore, separates the vertical and horizontal components of the beam physically to form an incident object beam 50 which is directed toward object 12, and a reference beam 62 which is shown leaving the crystal at an angle to the object beam 60. For purposes of this discussion assume that the object beam 60 is vertically polarized, and the reference beam 62 is horizontally polarized.

The light scattered by the object 12 is, as in previous embodiments, directed toward a plane of interference pattern 22 where the interference pattern in that plane is scanned as previously described. The reference beam 62 is directed toward a mirror 64, so that it is reflected back into the path of light scattered by the object 12 from the object beam 60. Again, as in the embodiment of FIG. 1, a half-silvered mirror 66 is positioned in the light scattered from the object beam and between it and the plane of interference pattern so that light from the reference beam is intercepted and reflected back toward the plane of the interference pattern 22 along a path which has the same axis as that of the light reflected from the object.

Since the light scattered by the object 12 is vertically polarized and the light from the reference beam is horizontally polarized, the two beams will not interfere even though they are modulated one relative to the other. Both beams are given the same polarization to produce an interference pattern. The method selected in this embodiment for producing a common polarization is the insertion of absorbing and polarizing film 68 which is called a linear absorber. This film will change the polarization of both the vertical and horizontally polarized object and reference waves to a single polarization, so that once again, an interference pattern appears at the plane 22. Interference pattern plane 22 is scanned, as previously described, in order to generate electrical wave forms having the light information necessary to produce a hologram from which the conjugate images of the object 12 may be reconstructed.

A number of ways have been described for generating the interference pattern, and it will be appreciated that various other arrangements and instrumentalities may be employed which fall within the true spirit and scope of the invention. For example, the modulation voltage need not be sawtooth but may be sinusoidal and further, a combination of phase and amplitude modulation may be used. It will equally well be appreciated that various means of producing a hologram from the interference pattern are possible.

One such means is illustrated in FIG. 9. Hologram camera 1 produces the wave form $f(t)$ and the electrical frequency domain illustrated in FIG. 3 as set forth previously. It is this output electrical wave form with which we are concerned here and not the means of generating it, therefore, details of hologram camera 1 are not shown in FIG. 9. The intensity equation $f(t)$ generated by hologram recorder 32 may be written in the form $$f(t) = [R]^2 + [U]^2 + (R^*U + U^*R)\cos\omega_1 t + j(R^*U - U^*R)\sin\omega_1 t$$

Utilizing the frequency components expressed in the above equation and providing the proper operators, two hologram transparencies may be generated which completely define the images. That is, one transparency or hologram may be made having information representing the real and imaginary parts of the image terms. This being so, both the pickup camera and reproducer resolution requirements can be reduced to that of the image terms themselves.

In order to reduce the reproducer resolution requirements, two reproducing channels 70 and 72 are provided. The intensity wave form coming from the hologram recorder 32 is multiplied in one channel 70 by $\cos\omega_1 t$ and in the other, (72) by $\sin\omega_1 t$ in separate product detectors 74 and 76 respectively, so that the real and imaginary parts of the image terms $(R^*U + U^*R)$ and $j(R^*U - U^*R)$ will be separately produced in the two channels. The $R^2$ and $U^2$ terms may be removed by a bandpass filter preceding the product detectors 72 and 74, or filtering may be left to lowpass filters 78 and 80 which follow product detectors 74 and 76 in the channels 70 and 72 respectively. Each of the lowpass filters 78 and 80 cut off at the product of the highest spatial frequency in the horizontal dimension of the image terms $f(x)$ and the image dissector scan velocity $v$. This results in eliminating the undesired $[U]^2 + [R]^2$ terms and the second harmonic terms from the product. The terms remaining after filtering the wave forms $f_c'(t)$ in cosine channel 70 and $f_s'(t)$ in sine channel 72 constitute the real and imaginary parts $f_{1c}(t)$ and $f_{1s}(t)$. These terms have the following form $$f_{1c}(t) = (R^*U + U^*R)$$
$$f_{1s}(t) = j(R^*U - U^*R)$$

Each of these waveforms (time functions) is applied, along with bias, terms to the reproducer (cathode ray tubes 82 and 84) in its respective channel. The images produced on the face of cathode ray tubes 82 and 84 respectively are recorded on film plates 86 and 88, respectively. The two transparencies 86 and 88 contain information representing the real and imaginary terms, $t_c$ and $t_s$ respectively. These terms are expressed as $$t_c(x, y) = b_c + (R^*U + U^*R)$$

and $$t_s(x, y) = b_s + j(R^*U - U^*R)$$

In order to produce a single reconstructed object from the information recorded on the two film plates 86 and 88 and made from the two-channel system of FIG. 9, the transparencies 86 and 88 are optically superimposed using plane waves 90° apart. The method of reproduction is illustrated in FIG. 10. A coherent plane wave is directed (along a horizontal axis as illustrated) through the film plate 86 which has real image terms stored thereon, and a lens system 91 having a focal length z is provided to focus the light diffracted by the film plate 86. Concurrently a coherent plane wave 92 (downward in the figure) which has its phase shifted 90° relative to the coherent plane wave 90 is directed through film plate 88. Another lens system 93, also having a focal length z, is provided to focus the light thus diffracted from imaginary image containing transparency 88 on a half-silvered mirror 94 disposed at an angle of 45° in the path of the light diffracted from the real film plate 86. Thus, the light directed on the mirror 94 from the lens system 93 is directly superimposed on the light from the real image. A reconstructed image of the initial object 12 is formed a distance z from the center of both lens systems as measured along the axis of the diffracted light beams. Due to bias terms ($b_c$ and $b_s$ in above equations) a spot appears in the center of the reconstructed image.

The primary difficulty with this system is that exceedingly accurate registration of images from the two film plates is required and accurate phase shift of the two waves is required. A significant method of minimizing both the registration and phasing problems of the reconstruction system described and illustrated relative to the systems of FIGS. 9 and 10 involves utilizing only a single channel of the hologram recording system illustrated in FIG. 9 and a unique recording film called "vectograph" film. This film consists of polarizing filters which allows separate recording of vertically and horizontally polarized components of a light wave.

Consider making the recording with only the upper channel 20 of FIG. 9 wherein the product detector 72 operating on the electrical waveform $f(t)$ multiplies by the function $\cos\omega_1 t$. A linear polarizer (not shown) is inserted between the face of the cathode ray tube 82 and the vectograph film plate 86, or, the polarizer may be inserted at any point in the interfering light paths. With the polarizer in the light path oriented so that its polarization is vertical, the real image components $t_c(x_1,y_1)$ of the light waves are recorded on the vectograph film. Next, the imaginary components $t_s(x_1,y_1)$ are recorded applying the function $\sin\omega_1 t$ to product detector 74 and with the linear polarizer rotated 90° to its horizontal position. Thus, two registered and separately addressable images are stored on a single substrate.

In order to reconstruct the image of object 12, the vectograph encoded film 86 (see FIG. 11 for the reconstruction components) is illuminated by a right or left circularly polarized plane wave 98, that is, a plane wave with vertical and horizontal components 90° apart. Since the vectograph film consists of polarizing filters, a vertically polarized plane wave is emitted which is modulated by the real part of recorded image and a horizontally polarized wave is emitted which is in time quadrature with the vertically polarized wave and which is modulated by the imaginary part of the recorded images. Waves of different polarization (horizontal and vertical) do not interfere. Therefore, real and imaginary components emitted by the vectograph film will not combine to form the desired image. As a consequence, it is necessary to insert a linear polarizer 100 (the linear polarizer film previously described with respect to the reconstruction for FIG. 8 will do) oriented at 45° in the emitted light path. With this orientation, light transmitted through the linear polarizer effectively combines equal components from the vertically and horizontally polarized portions of the incident light and thus combines equal components from the real and imaginary images $t_c$ and $t_s$, respectively.

A lens system 102 having a focal length $z$ which is equal to the distance between the object whose image is recorded and the plane of interference pattern 22 is positioned in the light path to focus light passing through linear polarizer 100. A reconstruction 104 of the object 12 appears a focal length away from the lens 102 and again, it will have a bright spot in the center due to bias terms. Thus a single-transparency is used to produce a reconstruction with all of the components involved and requiring no greater spatial bandwidth than that of a single-image term in an on-axis hologram.

In the systems discussed thus far, high-frequency signals are generated that must be resolved by devices which respond to the instantaneous time varying intensity of the interference pattern. As previously indicated, devices which can accomplish this include mechanically scanned photocells and image dissectors. These devices, however, have low light efficiency since they collect photons from a particular picture element only while the element is scanned. As a consequence, either high light levels or slow scanning rates may be required. Storage-type television cameras such slow scanning rates may be required. Storage-type television cameras such as vidicons and image orthicons integrate the light for an entire frame interval and then destructively read out the stored value for each element. Thus, the number of photons per element, for a given frame time, is increased by $n$ where $n$ is the total number of picture elements. These storage cameras have high light efficiencies. Although they cannot respond to high-frequency light variations, they can be efficiently used in holography if additional storage devices are used algebraically to combine a number of frames.

One embodiment using a vidicon or an othicon is illustrated in FIG. 12. This arrangement is similar in many respects to one of the channels of the embodiment of FIG. 9 utilizing the hologram camera 1 of the embodiment of FIG. 6. That is, light scattered from a coherently illuminated object 12 (light source not shown) is directed through the back of a half-silvered mirror 30 onto the face of a vidicon or orthicon tube 108 and a point reference source 43 is directed onto the front face of the half-silvered mirror 30 so that it is also incident upon the front face of the vidicon. In this case a switchable phase shifter 110, which may be of the electro-optical kind described with respect to the embodiment of FIG. 1 is placed between the point reference source 43 and the half-silvered mirror 30 so that the point reference source 43 is apparently in the center of object 12. Thus, the interference pattern to be recorded appears on a plane at the face of the vidicon tube 108. The output of the vidicon 108 is connekted directly to what may be termed a phase splitter 112 which has a positive and negative terminals 114 and 116, respectively, and a switchable contact arm 118 which may selectively be moved between positive and negative terminals 114 and 116. The phase splitter is connected by means of its switchable arm 118 to the cathode ray tube 120 which generates a picture on its face corresponding to the electrical waveform received from the phase splitter 112. A holographic recording is made on a film plate 122 which is shown adjacent to the face of the cathode ray tube 120.

When the arm 118 of phase splitter 112 is connected to the positive terminal 114, the phase splitter is applied to the cathode ray tube 120 with a positive amplitude. This voltage amplitude so applied is a direct function of the intensity of the interference pattern on the face of the vidicon tube. When contact arm 118 of phase splitter 112 is on the negative terminal 116, the amplitude of the wave form from the vidicon 108 applied to the cathode ray tube 120 is again a direct function of the interference pattern scanned but inverted.

In order to produce a hologram from which the image of the object 12 may be reconstructed, the hologram intensity on the vidicon is scanned once with the phase splitter connector arm 118 in the positive position 114, thus providing an intensity pattern $I_1(x_1,y_1)$ on the cathode ray tube face. Next, a voltage is applied to the switchable phase shifter 110 providing a phase shift (angle $\alpha$) in the reference beam path and the switch arm 118 on the phase splitter 112 is moved to the negative or reversed position 116. A second intensity pattern is generated on the face of the cathode ray tube 120 (hence on the film plate 122) represented by $I_2(x_1,y_1)$. Assuming that the amplitude transmittance of the film is equal to the resultant input intensity, the result of the amplitude transmission is given by $t = (I_1 - I_2)$ which expanded becomes:

$t = [R]^2 + [U]^2 + U*R + R*U - [(R)^2 + (U)^2 + U*Re^{j\alpha} + R*Ue^{-j\alpha}] = U*R(1 - e^{j\alpha}) + R*U(1 - e^{-j\alpha})$ Thus, the desired conjugate image terms are separated from the undesired $U^2$ and $R^2$ terms, although not from each other. In order to separate the conjugate image terms, it is necessary to create another transparency as provided by the two-channel system of FIG. 9 and a reconstruction utilizing the optical reconstruction system using two transparencies as illustrated and described with respect to FIG. 10, or the single transparency "Vectograph" system of FIG. 11.

In order to understand how the two transparencies are made consider the phase shift as $\pi/2$ radians for the second intensity pattern $I_2$. That is, the first transparency $t_1$ is produced from $(I_1 - I_2)$ using the phase shift $\pi/2$ radians for $I_2$. A second transparency $t_2$ is produced first using a phase shift of $\pi/2$ with the phase splitter switch arm 118 in the positive position. That is to say, the first intensity pattern for the second transparency is generated leaving the phase shifter voltage as it was to take the initial intensity pattern $I_2$ and moving the phase splitter arm to its positive position 114. Thus, this intensity pattern may be considered a positive $I_2$.

Next the phase splitter switch arm 118 is moved to the negative position 116, the voltage of the phase shifter is adjusted so that there is a phase shift of $\pi$ radians from the initial position or $\pi/2$ radians from the condition when the intensity pattern $I_2$ was taken. The new intensity pattern $I_3$ is recorded on the film plate 122. Thus, a second transparency $t_2 = (I_2 - I_3)$ is produced.

When these two transparencies, i.e., $t_1$ and $t_2$ are combined in spatial quadrature as shown and described with respect to FIG. 10, an image is produced as indicated by the following equation $t_1 + jt_2 = (I_1 - I_2) + j(I_2 (31) - I_3) = 2(1 + j)R*U$ The desired image term is thus isolated and a single object image is reconstructed. If the other conjugate image ($U*R$) is desired, the transparencies are combined as $t_1 - jt_2$. Again, as described relative to image reconstruction using two transparencies described in connection with FIG. 10.

Thus, three scanned frames, taken with different static phase shifts and subtracted from each other in storage devices, can be used to isolate the desired image terms with no spatial offset of the reference required. Like the two-channel system described relative to FIG. 9, however, the method just described has the disadvantage of requiring two transparencies (or a single vectograph film as described relative to the reconstruction shown in FIG. 11) and having a bright point within the reconstructed object due to the bias terms in the transparencies.

The hologram can be placed on a single transparency with the reconstructed conjugate images just spatially offset from each other as shown and described relative to the reconstruction system illustrated in FIG. 7. This is done by modulating the $(I_1 - I_2)$ wave form with $\cos\omega t$ and the $(I_2 - I_3)$ waveform with $\sin\omega t$.

$f_1(t) = (I_1 - I_2)\cos\omega t - (I_2 - I_3)\sin\omega t$ which expanded is $f_1(t) = I_1\cos\omega t - I_2(\cos\omega t + \sin\omega t) + I_3(\sin\omega t)$ One way to generate the proper output waveform directly as written in the first of the two equations above is, for example, to record the interference pattern as generated with respect to the arrangement of FIG. 12 using a storage camera and a video disc. That is, the electrical wave form for $I_1$ may be generated with the arm of phase splitter in FIG. 12 in the positive position and record on video disc rather than transmit directly to the cathode ray tube 120. The arm of the phase splitter may then be moved to its negative position and $I_2$ generated, as previously described, and also recorded on video disc. The output of the two recorded wave forms $(I_1 - I_2)$ may be fed into a multiplier which multiplies by the operator $\cos\omega t$ and the wave form so generated applied to a cathode ray tube. The image which results on the face of the cathode tube is recorded on a film plate. The $I_2$ and $I_3$ waveforms may be generated precisely as described above and recorded on video disc. The output of the two wave forms $-(I_2 - I_3)$ are then applied to the multiplier which operates on them by the multiplier $\sin\omega t$, thus generating the $-(I_2 - I_3)\sin\omega t$ term which again is recorded on the film plate. The resultant recorded interference pattern constitutes a hologram which produces a reconstruction identical to that shown in FIG. 7.

The electrical wave form described by the second of the two equations above is generated as the sum of three hologram intensities with relative reference phases of zero, $\pi/2$ rad, and $\pi$ rad and multiplying signals by $\cos\omega t, -(\cos\omega t + \sin\omega t)$ and $\sin\omega t$. In order better to understand the operation, consider first the equations. Substituting for $I_1$, $I_2$ and $I_3$ and using the assumed phase shifts in the above equation $f_1(t) = U*R(1 - j)e^{-j\omega t} + R*U(1 + j)e^{j\omega t}$ when this wave form is applied to a storage camera, the output intensity $I_0(x,y)$ is given by $I_0(x,y) = U*R(1 - j)e^{-j(\omega x/v)} + R*U(1 + j)e^{j(\omega x/v)}$ The conjugate image terms are thus separated as long as $\omega/2\pi v$ is greater than or equal to the highest image spatial frequency. The resultant reconstruction will be identical to that shown in FIG. 6. As in that system, the camera spatial frequency requirements are the same as that of conjugate image terms but the reproducer must have twice the spatial bandwidth in the horizontal or $x$-dimension.

A practical way to generate the wave forms and intensity patterns described in the equations immediately above is illustrated in FIG. 13. Since most of the elements of FIGS. 12 and 13 are the same, corresponding elements are given the same reference numerals in both figures for simplicity. The difference between the two figures is that in FIG. 13 a multiplier 124 is substituted in the circuit between storage tube 108 and cathode ray tube for the phase splitter 112 and the reference beam phase shifter 110 is, as illustrated, provided with taps or terminals 126, 128, and 130 for the zero, or reference position, $\pi/2$ radians phase shift (from zero), and $\pi$ radians phase shift respectively. Multiplier 124 also is shown with three taps 132, 134, and 136 which respectively provide multipliers of $\cos\omega t$, $-(\cos\omega t + \sin\omega t)$ and $\sin\omega t$.

The desired electrical wave form is generated by first placing the contact arm on the phase shifter at zero or reference position (tap 126) and the contact arm of the multiplier at the tap 132 which provides a multiplier $\cos\omega t$. The significance of placing the phase shifter arm at zero is simply that we may start with any phase shift in the path of the reference beam. The storage camera 108 generates the electrical wave form corresponding to an intensity pattern $I_1$. This wave form is applied to the multiplier 124. Since multiplier 124 has an input which is a function of $\cos\omega t$, $I_1$ is multiplied by $\cos\omega t$ and generates the wave form $I_1 \cos\omega t$ that is displayed on the face of the cathode ray tube 120 and stored by some means as on the film plate 122.

Next, the contact arm of the phase shifter 110 is moved to the position labeled $\pi/2$ (tap 128). Thus the voltage across the phase shifter 110 is changed so that the reference beam is shifted in phase by 90° from the position when the first intensity pattern $I_1$ was generated. The contact arm of the frequency multiplier may be ganged with that of the phase shifter or it simply may be moved to the terminal 134 marked $-(\cos\omega t + \sin\omega t) = -\sqrt{2} \cos(\omega t - 45°)$. Thus, a wave form representing the intensity pattern $I_2$ is generated and multiplied by $-(\cos\omega t + \sin\omega t)$ and stored on the film plate 122 giving the first two full terms of the desired equation.

Next, the contact arms for the phase shifter 110 and multiplier 124 are moved to the upper positions marked $\pi$ and $\sin\omega t$, respectively, and the term $I_3 \sin\omega t$ is generated and recorded on the film plate 122. Thus, using this scanning technique and forming the sum of three hologram intensities with relative reference phases of zero, $\pi/2$ and $\pi$ radians and the appropriate multiplying signals, a hologram is formed wherein the conjugate image terms are separated and reconstruction of the object image can be accomplished as described relative to FIG. 7.

The system just described may be used in a motion situation, for example, to provide real-time, three-dimensional television. This may be accomplished by combining three successive frames which are each shifted by $\pi/2$ radians to form the desired separate images for each group of three, and apply them to a film. This would then require three input frames for one output frame and reduce the allowable motion that should take place during the three frames.

An alternate arrangement is to take advantage of the low acuity of human vision to objects in motion. Here the final three frames are always used to make the output frame, so that each new frame becomes the third of a sequence. Thus one frame is formed from $I_1$, $I_2$, and $I_3$, while the next is formed from $I_2$, $I_3$, and $I_4$ appropriately offset. The input frame rate is thus the same as that of the output. One way to accomplish this is to record successive image frames on a video disc and combine each of the three successive channels progressively. During relatively rapid motion of the object, the three frames will differ so that complete cancellation of undesired terms will be disturbed. However, during motion human vision tends to be less aware of these disturbances, otherwise phenomena such as television interlace would be unsuccessful. Thus, this system presents an effective means of obtaining live real-time holography.

Most systems previously described discuss having the processed output applied to photographic film. All of the systems described may be used so that the processed generated signals create a continuously addressable variable transparency which, when viewed in coherent light, provides a real-time reconstruction that displays motion.

A number of existing materials have the desirable property of exhibiting control of their light transmission. One such class of materials is known as photochromics. This material has the desirable property that its transmission varies inversely as the applied intensity. Photochromic materails exhibit wave-length selection which allows addressing of the controlled transparency with a wave length that varies its transmission and viewing it with a light source which doesnt appreciably affect its transmission. For example, cathode ray tubes with ultraviolet phosphorous can be used to address the photochromic materials with the processed wave forms which are simultaneously viewed in helium neon laser light which doesnt change the transmission of the materials. A similar class of materials are the saturable dyes used in pulsed lasers, such as the phylocyanides.

Another general class of materials that can be electrically addressed includes the electro-optical materials such as ADP, KDP, etc., which can provide either variable-phase or variable-density holograms by applying an addressed electrical field across the crystal. (ADP, ammonium dihydrogen phosphate; KDP, potassium dihydrogen phosphate; KTN, potassium trihydrogen nitrate). These materials have successfully been placed inside cathode ray tubes or within a vacuum and scanned with modulated electron beams to create an addressed field across then. The field at each point determines the difference in index of refraction for the vertically and horizontally polarized waves. Linear polarizers and analyzers convert this difference into controlled transmission. Thus the processed signals are used to modulate the scan beam which, in turn, controls the transmission of the material to a coherent light source to reconstruct the object. Another electron beam addressed device is the Eidophor, which provides thickness or phase variations on an oil film that can be used for real-time holography.

All of the holographic imaging systems described to this point have assumed coherent light sources. The only requirement for holography, however, is that each object point create a diffraction pattern which uniquely defines its position in space. In the case of holography using a planar reference wave (coherent) the diffraction pattern created is a fresnel transform or zone plate, while in the case where a point reference source is utilized the diffraction pattern is a fourier transform or grating structure. The grating structure diffraction pattern can be achieved where incoherent light sources are used by causing object points to interfere with themselves. The basic principle involves using two optical systems to create two real images of the object. Since each corresponding object point on the two object images has the identical temporal frequency spectrum, they are temporally coherent and can interfere with each other. Thus a hologram can be made where the interference between the corresponding image points is recorded, forming a pattern similar to that of a coherent system in which each object point is interfering with a reference point.

There are two primary problems in obtaining a usable holographic reconstruction in incoherent holography. One problem is that the total light scattered from the object onto the plane of an interference pattern is so much greater than the light from corresponding object points on the object images that the interference pattern is in effect swamped or overcome by intensity of the non-interfering light. The second problem, which also relates to intensity of the interference pattern, is that unless the path length of light from corresponding points on the object images is almost precisely the same from the initial object point, the light waves emitted from the images will not interfere. Relatively small differences in path length can completely destroy the interference pattern because of the short coherence length. The reason that such small path length differences are not so critical with respect to coherent holography is that for coherent holography both the object and the reference waves are essentially sinusoidal and of the same frequency; consequently, an interference pattern can almost always be obtained regardless of the relatively long path length difference at which the two light sources reach the plane of the interference pattern. However, consider an incoherent visible light source with the center of wave length $\lambda$ of 6,000 Angstroms and a relatively narrow bandwidth $\Delta\lambda$ of 1 Angstrom. The resultant coherence length 1 is only 0.36 centimeters. That is, if the difference in path length between the initial object point through the corresponding point on each of the interfering images to the hologram plane differs by more than 0.36 cm, the interference pattern is effectively destroyed.

In order to assure that the path lengths are equalized along the optical axis of the system, the preferred embodiment utilizes a triangular interferometer. The triangular interferometer gets its name from the fact that three mirrors are used each having its center point at one corner of a triangle (illustrated in FIG. 14) which corners represent the optical axis of light waves in the interferometer. Thus, the axis of the light waves (the only part of the waves shown here) in the interferometer define the sides of a triangle.

Referring specifically to FIG. 14, an object 12 scatters light from an incoherent wave (light source not shown) along a horizontal axis 141. The light first encounters a half-silvered mirror or beam splitter 140 with its axis $\alpha/2°$ relative to the axis of the light beam so that part of the light is reflected vertically (142) and part of the light continues straight through the mirror (beam axis 144). The part of the light beam 144 which is transmitted, next encounters a full mirror 146 which is set perpendicular to the bisector of angle $\beta$, thereby to reflect the light at an angle $\beta$ with respect to the original beam and back toward the original object beam (axis 148). Here it encounters still a third mirror 150 at the apex of the triangular interferometer which is positioned perpendicular to an angle of $\gamma/2°$ relative to the vertical beam axis 142 so that it directs the light from mirror 146 back through the original half-silvered mirror 140 at the corner of the triangle first encountered by the original incident light beam 141. Any angles $\alpha$, $\beta$, and $\gamma$ can be used as long as the first mirror 140 bisects $\alpha$, and the other two mirrors are perpendicular to the bisectors of $\beta$ and $\gamma$.

The second light path constitutes that part of the orginal beam 141 which is incident on the half-silvered mirror and reflected upward (142) so that it travels clockwise around the triangle and is finally reflected down by the first encountered half-silvered mirror 140. Both the clockwise and counter-clockwise light path lengths around the triangle are identical.

In order to provide displaced corresponding points for an interference pattern, two concentric but different size images 151 (the smaller) and 154 are provided by inserting a lens system 152 in one leg of the triangular light path. In this embodiment the lens 156 is placed between the first encountered beam splitter 140 and the upper mirror 150 along the vertical beam axis 142. Since the light path from the object 12 to the lens 156 in the clockwise direction is shorter than that in the counter clockwise direction, magnification is different for the two paths. This results in the images 152 and 154 being of different size. It is desirable to have the two images on the same center since this provides the minimimum distance between the corresponding object points on the two images and therefore minimizes spatial frequencies in the interference plane 22. The center of the real images is located a distance $z$ from the interference pattern plane 22. A hologram recorder 158 of a type previously described, e.g.; in connection with FIG. 1, is used to record the light information in the interference pattern.

An interference pattern produced as described so far produces an on-axis hologram with its attendant disadvantages. in order to provide an on-axis system with all of the associated advantages of the present invention, a temporal modulation system must be used to cause the clockwise and counter-clockwise waves to have different center frequencies. At a glance it is seen that the problem with this configuration is that no region exists which is not common to both optical paths. Thus, a light modulator must be used which will shift the frequency of the clockwise and counter-clockwise waves in opposite directions. A rotating half-wave plate has the desired property. That is, waves traveling in opposite directions have their frequencies shifted in opposite directions. The rotating half-wave plate is a well-known method of frequency translation and therefore will not be described here. It is fully described in a Perkin Elmer publication by Robert Crane entitled "Interference Phase Measurement" published from Perkin Elmer Symposium on "New Developments in Interferometry," Sept. 21, 1967.

A frequency translator (not shown) is placed anywhere within the triangular interferometer of FIG. 14. The resultant pair of real images 152 and 154 will thus be separated in frequency. Where a rotating halfwave plate is used, the images are separated by $4\omega$ where $\omega$ is the angular rotation frequency of the half-wave plate. Thus this arrangement offers all of the advantages of minimum path length differences of the triangular interferometer along with temporal frequency offset which allows the use of an on-axis system.

While particular embodiments of the invention have been shown and described, it will of course be understood that the invention is not limited thereto since many modifications in the circuits, optical arrangements, and in the intrumentalities employed may be made. It is contemplated that the appended claims will cover any such modifications as fall within the true spirit and scope of the invention.

What is claimed is:

1. In a system for producing a hologram recording from which a three-dimensional image of a three-dimensional object may be reconstructed,
   A. Means for illuminating the said object with an incident beam of light whereby said light is scattered by said object forming an object beam;
   B. means for forming an image-information beam which includes 1. means for forming a light reference beam having substantially the same frequency spectrum as said object beam,
2. means for cyclically temporally offsetting the phase relationship between said reference and object beams, in a continuous manner over the period of a cycle,
3. means for combining said light reference beam and said object beam thereby to provide a light interference pattern containing information relative to conjugate images of the said object.

2. In a system for producing a hologram recording from which a three-dimensional image of a three-dimensional object may be reconstructed as defined in claim 1 wherein said means for cyclically temporally offsetting the relationship between said reference and object beams in a continuous manner over the period of a cycle constitutes a modulator in the path of said reference beam for cyclically offsetting the light from said reference beam.

3. In a system for producing a hologram recording from which a three-dimensional image of a three-dimensional object may be reconstructed as defined in claim 1 wherein said means for cyclically temporally offsetting the relationship between said reference and object beams in a continuous manner over the period of a cycle constitutes a modulator in the path of said incident object beam whereby said object beam is cyclically offset in time.

4. In a system for producing a hologram recording from which a three-dimensional image of a three-dimensional object may be reconstructed as defined in claim 1 wherein said means for cyclically temporally offsetting the relationship between said reference and object beams in a continuous manner over the period of a cycle constitute modulating means for temporally offsetting both said reference and object beams in opposite senses.

5. In a system for producing a hologram recording from which a three-dimensional image of a three-dimensional object may be reconstructed as defined in claim 1, scanning means for scanning said image information beam thereby to produce electrical wave forms having frequencies corresponding to said conjugate images.

6. In a system for producing a hologram recording from which a three-dimensional image of a three-dimensional object may be reconstructed, as defined in claim 5, including additionally a pair of individual output channels connected to receive said electrical wave forms produced by said scanning means and having frequencies corresponding to said conjugate images, each of said output channels having a product detector, a lowpass filter and a display device serially connected, the said product detector in one output channel multiplying the electrical wave forms from said scanning means by a cosine function of frequency and time and the other product detector in said other channel multiplying the electrical wave forms produced by said scanning means by a sine function of the same frequency and time thereby to produce electrical wave forms containing the real and imaginary parts of the conjugate image terms each in one of said two output channels, said lowpass filter means provided for eliminating undesired frequencies in said electrical wave forms, and each of said display means provided for producing a display of one of the real and imaginary parts of said conjugate images whereby a separate individual recording can be made of the real and imaginary parts of said conjugate images.

7. In a system for producing a hologram recording from which a three-dimensional image of a three-dimensional object may be reconstructed as defined in claim 1, scanning means for scanning said image information beam and producing a midband frequency spectrum including information corresponding to the square of the amplitude of the said object and reference beams, and frequency sidebands separated from said midband frequency spectrum including information relative to the said conjugate images.

8. In a system for producing a hologram recording from which a three-dimensional image of a three-dimensional object may be reconstructed as defined in claim 7, display means connected to receive electrical wave forms from the said scanning means thereby to produce a visual display of the said conjugate image information in said sidebands whereby a hologram recording may be made.

9. In a system for producing a hologram recording from which a three-dimensional image of a three-dimensional object may be reconstructed, as defined in claim 7, film means for recording the visual display of the said conjugate image information.

10. In a system for producing a hologram recording from which a three-dimensional image of a three-dimensional object may be reconstructed as defined in claim 7, electrical circuit means for receiving the electrical wave forms from said scanning means including filter means for passing only the said sideband frequency spectra containing the conjugate light information, and display means for displaying the complex light pattern containing the conjugate image light information passed by the said filter means whereby the hologram recording may be made.

11. In a system for producing a hologram recording from which a three-dimensional image of a three-dimensional object may be reconstructed as defined in claim 10, mixer means connected to receive the said electrical wave forms from the said scanning means and to heterodyne the center frequency of the said image information containing sidebands down to a lower frequency.

12. In a system for producing a hologram recording from which a three-dimensional image of a three-dimensional object may be reconstructed,
A. means for illuminating the said object with an incident object beam of light whereby said light is scattered by said object forming an object beam with its axis perpendicular to a plane of interference pattern,
B. means for forming an image information beam which includes
1. means for forming a light reference beam which emanates from a point source apparently in the center of the three-dimensional object which includes
   a. means for forming a light reference beam
   b. means for focusing said light reference beam to a point between said means for focusing and said object beam which point constitutes a point reference source off-axis from the axis of said object beam and, with its axis intercepting the axis of said object beam at a point which places the said point reference source and a point at the center of the said object equal distances from the said point of interception, and c. a half-silvered mirror in the path of both said light reference beam and object beam at the said point of interception at an angle such that light from said point reference source is reflected into the plane of said interference pattern so that the said point reference source apparently comes from the center of said object.

13. In combination in a system for producing a hologram recording from which a three-dimensional image of a three-dimensional object may be reconstructed, a hologram camera means for generating electrical wave forms from light information necessary to produce a hologram from which the conjugate images of an object may be reconstructed, a pair of individual output channels connected to receive said electrical wave forms produced by said scanning means and having frequencies corresponding to said conjugate images, each of said output channels having a product detector, a lowpass filter and a display device serially connected, the said product detector in one output channel multiplying the electrical wave forms from said scanning means by a cosine function of frequency and time and the other product detector in said other channel multiplying the electrical wave forms produced by said scanning means by a sine function of the same frequency and time thereby to produce electrical wave forms containing the real and imaginary parts of the conjugate image terms each in one of said two output channels, said lowpass filter means provided for eliminating undesired frequencies in said electrical wave forms, and each of said display means provided for producing a display of one of the real and imaginary parts of said conjugate images whereby separate individual recordings can be made of the real and imaginary parts of said conjugate images.

14. In combination in a system for producing a hologram recording from which a three-dimensional image of a three-dimensional image of a three-dimensional object may be reconstructed, hologram camera means for generating electrical wave forms from light information necessary to produce a hologram from which the conjugate images of an object may be reconstructed, at least one individual output channel connected to receive the said electrical wave forms produced by said scanning means, said output channel having a product detector, a lowpass filter and a display device serially connected.

15. A method for producing a hologram recording on a single substrate including generating an image-information beam containing an interference pattern with information to reconstruct a three-dimensional image of a three-dimensional object, producing an interference pattern therefrom, scanning said interference pattern thereby to produce electrical wave forms containing image information, multiplying said electrical wave form by one of sine and cosine function of a frequency-time product whereby information relative to one of real and imaginary image components of the conjugate image of said object generated, generating a display from said electrical wave forms on a display device whereby a light beam containing said image information is formed, positioning a recording film which consists of vertically and horizontally polarized filters to receive light from said display means and positioning a linear polarizer in one of the said light beams containing image information so that it is oriented in one of its vertical and horizontal polarizations whereby one of the real and imaginary image components of light waves are recorded on said film, rotating said linear polarizer to the opposite one of its vertical and horizontal polarization and multiplying the said electrical wave form by the other of said sine and cosine functions of the frequency-time product thereby to record on said film the opposite of said real and imaginary components of the said light waves.

16. In combination in a system for reconstructing an image of an object from a film transparency which consists of vertically and horizontally polarized filters on which separate recordings of vertically and horizontally polarized components of a light wave have been made including light producing means to project a circularly polarized plane wave through said transparency, linear polarizer means positioned in the said light from said light producing means and oriented with its axis of polarization displayed substantially 45° relative to both the vertically and horizontally polarized portions of the incident light whereby light transmitted through the linear polarizer effectively combines equal components from the vertically and horizontally polarized portions of the incident light and thereby combines equal components from real and imaginary image components from the said transparency, and means to focus light transmitted thereby to reconstruct an image of the original object.

17. In combination in a system for producing a hologram recording from which a three-dimensional image of a three-dimensional object may be reconstructed,
A. hologram camera means for producing an interference pattern from object and reference means on an interference plane having light information for reconstruction of a three-dimensional image of a three-dimensional object,
B. said hologram camera including a phase shifting device for shifting the relative phase of the said object and reference beams,
C. a storage type television camera which integrates incident light for an entire frame interval and destructively reads out the stored value for each element positioned to receive the said interference pattern and produce an output electrical wave form representative thereof,
D. phase splitter means connected to receive the output of said storage camera
  1. said phase splitter having positive and negative terminals for producing an output voltage that is a direct function of the intensity of the interference pattern on the face of the said television camera in a positive sense on its positive terminal and inverted on its negative terminal
E. a display device connected to be selectively switched, thereby selectively to receive the said positive and negative outputs from the said phase splitter.

18. In combination in a system for producing a hologram recording especially adaptable for use with incoherent illumination and from which a three-dimensional image of a three-dimensional object may be reconstructed, A. means for illuminating the said object with an incident beam of light whereby said light is scattered by said object forming an object beam, B. a triangular interferometer in the path of said object beam whereby part of said object beam travels a triangular path in a clockwise fashion and another part of said object beam travels a triangular path in a counter-clockwise direction, C. a lens system in one leg of said triangular interferometer thereby to form two images of the said object on the same center but of different sizes whereby corresponding object points on the two images interfere, D. a light modulator means in the path of said light beams in the said interferometer which shifts the frequency of clockwise and counter-clockwise beams in opposite senses, and E. a hologram recorder for producing a holographic recording to an interference pattern produced by interference between corresponding object points on the said two images.

19. A method of producing transparency means from which a three-dimensional image of a three-dimensional object may be reconstructed for generating reference and object beams, combining said beams to generate an image information beam containing an interference pattern thereby to produce electrical wave forms containing image information, displaying an image produced by said wave forms on the face of a display means, and recording said intensity pattern on a transparency, shifting the phase between the interference pattern producing reference and object beams by $\pi/2$ radians, scanning said interference pattern and inverting (negative) the electrical waveforms so produced, displaying an image produced on display means by the said inverted wave forms and recording the image so displayed, producing a second set of stored images first using the phase shift of $\pi/2$ radians, scanning the resultant interference pattern to produce electrical wave forms reinverting the said wave forms (positive) producing an image on said display means and storing said information of a second transparency, shifting the relative phase of the said object and reference beams another $\pi/2$ radians, scanning the interference pattern and producing electrical wave forms, inverting the said wave forms (negative)and producing an image from said wave form on the said display means, and recording the resultant intensity pattern on said second transparency.

20. A method for producing transparency means from which a three-dimensional image of a three-dimensional object may be reconstructed, generating reference and object beams, combining said beams to generate an image information beam containing an interference pattern with conjugate image information, scanning the said interference pattern thereby to produce electrical wave forms containing image information, multiplying said wave forms by the function $\cos \omega t$, displaying an image of the resultant wave form on a display means, and storing the image so produced on a transparency, shifting the phase between the interference pattern producing reference and object beams by $\pi/2$ radians, scanning said interference pattern thereby to produce an electrical wave form, multiplying said wave form by the function $-(\cos \omega t + \sin \omega t)$ to multiply the output of the said storage camera by this function, and storing the resultant image produced on the face of the said image display means on the said transparency, provide a relative phase shift of $\pi$ radians between the said interference pattern producing reference and object beams, scanning said interference pattern to produce electrical wave forms, multiplying the said wave forms by the function $\sin \omega t$, thereby to multiply the output of said storage camera by this function and storing the image produced by the said image display means.

21. In a combination in a system for producing a hologram from which a three-dimensional image of an object may be reconstructed A. A source of coherent illumination directed toward the object the image of which is to be reconstructed, B. a beam splitter between said source of coherent illumination and said object whereby part of said illumination impinges upon and is scattered from said object and part of said illumination is directed along a second path constituting a reference beam C. light modulation means in said second path for cyclically modulating said reference beam, in a continuous manner over the period of a cycle D. means for combining said modulated light beam with illumination scattered from said object thereby to form an image information beam, E. scanning means to scan said image information beam thereby to generate electrical wave forms with frequencies representing said image information, F. image producing means connected to receive electrical wave forms generated by said scanning means and produce a holographic image for recording, and G. electrical circuit means connected to receive the said electrical wave forms from said scanning means and to supply said image reproducing means,
  1. said electrical circuit means including means to eliminate undesired frequencies and reduce the frequencies of desired image information containing wave forms thereby to reduce resolution requirements of said image producing means.

22. In combination in a system for producing a hologram recording from which a three-dimensional image of a three-dimensional object may be reconstructed, A. hologram camera means for producing an interference pattern from object and reference beams on an interference plane having light information for reconstruction of a three-dimensional image of a three-dimensional object, B. said hologram camera including a phase shifting device for shifting the relative phase of the said object and reference beams, C. a storage type television camera which integrates incident light for an entire frame interval and destructively reads out the stored value for each element positioned to receive the said interference pattern and produce an output electrical wave form representative thereof, D. phase splitter means connected to receive the output of said storage camera,
  1. said phase splitter having positive and negative terminals for producing an output voltage that is a direct function of the intensity of the interference pattern on the face of the said television camera in a positive sense on its positive terminal and inverted on its negative terminal, E. Storage means for storing image information developed by said phase splitter connected to receive the output from said phase splitter, including
1. switching means connected to be selectively switched, thereby selectively to apply the said positive and negative outputs from the said phase splitter to the said storage means.

23. In combination in a system for producing a hologram recording from which a three-dimensional image of a three-dimensional object may be reconstructed, A. means for illuminating the said object with an incident beam of light whereby said light is scattered by said object forming an object beam, B. a triangular interferometer in the path of said object beam whereby part of said object beam travels a triangular path in a clockwise fashion and another part of said object beam travels a triangular path in a counter-clockwise direction, C. a lens system in one leg of said triangular interferometer thereby to form two images of the said object of different sizes whereby corresponding object points on the two images interfere, D. a light modulator means in the path of said light beams in the said interferometer which shifts the phase or frequency of clockwise and counter-clockwise beams in opposite senses, and E. storage means connected to receive the output from the said multiplier means.

24. A method of producing transparency means from which a three-dimensional image of a three-dimensional object may be reconstructed for generating reference and object beams, combining said beams to generate an image information beam containing an interference pattern thereby to produce electrical wave forms containing image information, storing image information contained in the said electrical wave forms, shifting the phase between the interference pattern producing reference and object beams by $\pi/2$ radians, scanning said interference pattern and inverting the electrical wave forms so produced, storing image information developed by the said electrical wave forms, producing additional image information first using the phase shift of $\pi/2$ radians, scanning the resultant interference pattern to produce electrical wave forms, reinverting the said wave forms and storing said information, shifting the relative phase of the said object and reference beams another $\pi/2$ radians, scanning the interference pattern and producing electrical wave forms, inverting the said wave forms and recording the resultant image information so produced.

25. A method for producing transparency means from which a three-dimensional image of a three-dimensional object may be reconstructed, generating reference and object beams, combining said beams to generate an image information beam containing an interference pattern with conjugate image information, scanning the said interference pattern thereby to produce electrical wave forms containing image information, multiplying said wave forms by the function $\cos\omega t$, and storing the image information contained therein on information storage means, shifting the phase between the interference pattern producing reference and object beams by $\pi/2$ radians, scanning said interference pattern thereby to produce an electrical wave form, multiplying said wave form by the function $-(\cos\omega t + \sin\omega t)$ to multiply the output of the said storage camera by this function, and storing the resultant image information of the said information storage means, provide a relative phase shift of $\pi$ radians between the said interference pattern producing reference and object beams, scanning said interference pattern to produce electrical wave forms, multiplying the said wave forms by the function $\sin\omega t$, thereby to multiply the output of said storage camera by this function and storing the image information so produced on the said storage means.

26. In combination in a system for producing a hologram recording especially adaptable for use with incoherent illumination and from which a three-dimensional image of a three-dimensional object may be reconstructed, A. means for illuminating the said object with an incident beam of light whereby said light is scattered by said object forming an object beam, B. means for dividing said object beam into two paths thereby effectively to form first and second independent beams with object information therein whereby two images of said object may be produced having corresponding object points displaced, c. light modulator means in the path of said two light beams temporally offsetting the phase relationship between the said two light beams by shifting their phases in opposite senses thereby to produce a light interference pattern.

* * * * *